Oct. 30, 1928.
L. O. CALLISTER
1,689,715
ELECTRIC SAFETY DEVICE FOR AUTOMOBILES
Filed April 19, 1926  3 Sheets-Sheet 1
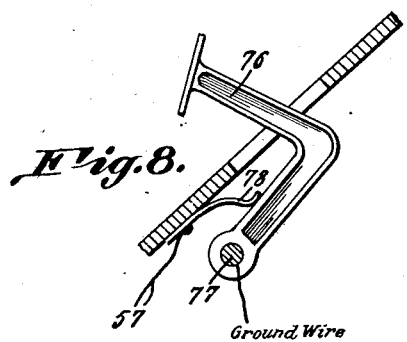
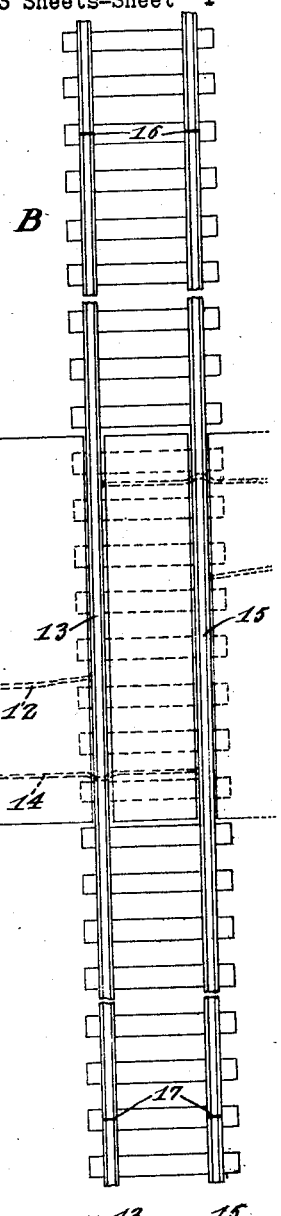
INVENTOR.
L. O. Callister,
BY
ATTORNEYS Oct. 30, 1928.
L. O. CALLISTER
1,689,715
ELECTRIC SAFETY DEVICE FOR AUTOMOBILES
Filed April 19, 1926    3 Sheets-Sheet 2
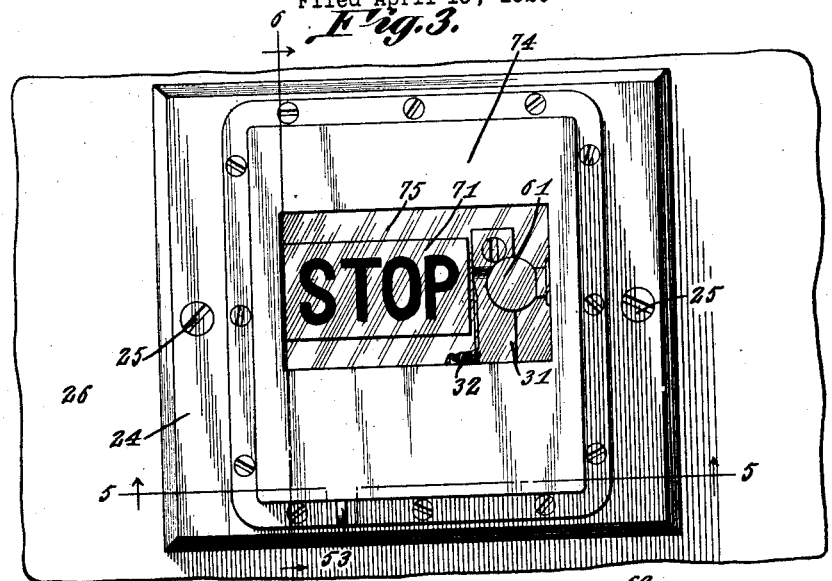
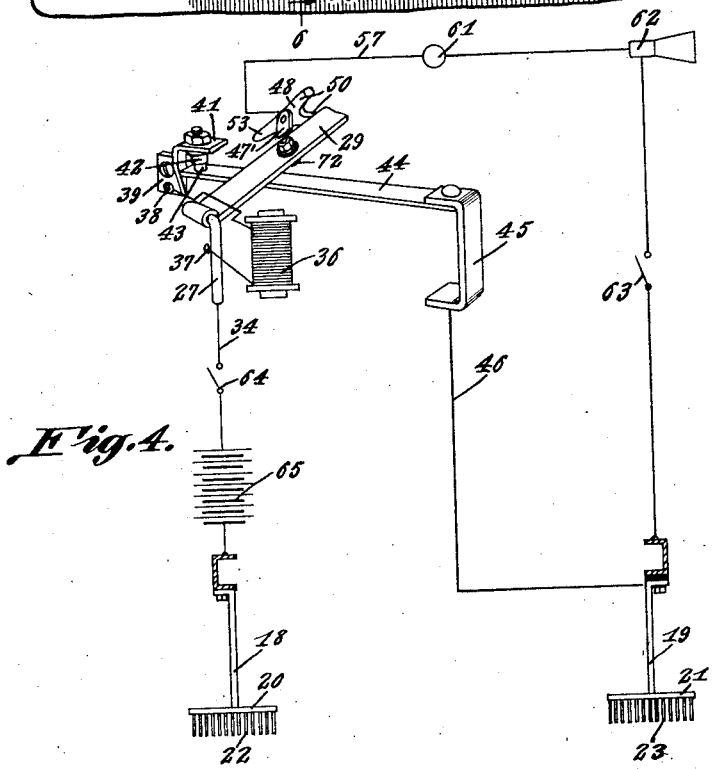
INVENTOR.
L. O. Callister
BY
ATTORNEYS Oct. 30, 1928.

L. O. CALLISTER 1,689,715

ELECTRIC SAFETY DEVICE FOR AUTOMOBILES

Filed April 19, 1926    3 Sheets-Sheet 3

INVENTOR.
L. O. Callister

BY
ATTORNEYS

Patented Oct. 30, 1928.

1,689,715

UNITED STATES PATENT OFFICE.

LEE O. CALLISTER, OF SHERIDAN, WYOMING, ASSIGNOR OF ONE-HALF TO ARTHUR W. DOYLE, OF SHERIDAN, WYOMING.

ELECTRIC SAFETY DEVICE FOR AUTOMOBILES.

Application filed April 19, 1926. Serial No. 103,184.

The present invention has as its general object to prevent collisions of motor driven road vehicles and trains at grade crossings. Means are provided whereby, upon the entrance of a train into a track section within an established distance of the roadway, the motor of an automobile or the like, which is approaching will be automatically stopped. The roadway is equipped with a pair of spaced conductors, each in electrical connection with one of the rails of the railway track and the automobile is equipped with contacters depending from the frame of the machine and so spaced as to be adapted to co-operate with the roadway conductors. If these conductors or feelers are in contact with the conductors and a train enters the prescribed section, an electric circuit is completed which, through means to be particularly described hereinafter, switches off the automobile motor and gives appropriate warning signals to the driver.

In the accompanying drawings:

Fig. 1 is a plan view of a grade crossing showing highway conductors in position.

Fig. 2 is a side elevation of Fig. 1, taken longitudinally of the highway and showing an automobile provided with feelers for contacting with the highway conductors.

Fig. 3 is a face view of the casing in which the operating mechanism is housed.

Fig. 4 is a diagrammatic view showing the feelers in circuit with their co-operating mechanism.

Fig. 8 shows an automobile brake lever adapted to act as a circuit breaker.

Figure 5:
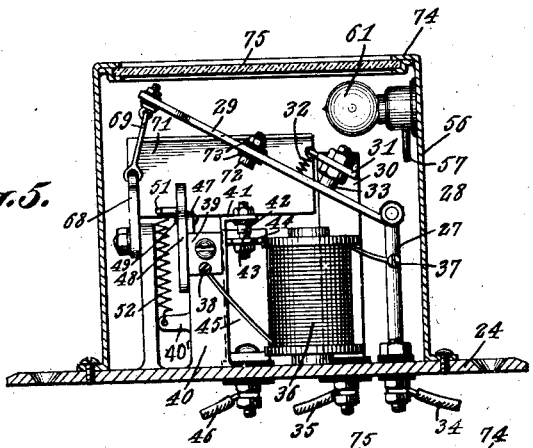
Fig. 5 is a section on the line 5—5 of Fig. 3.

Referring now to the drawings wherein like reference characters denote like parts in the several views, A represents a highway and B an intersecting railway track. At the right of the highway are disposed conductors 10 and 11 which are of considerable length and parallelly spaced apart at such distance as to bring them within the gage of an automobile. These conductors may be constituted by old railroad rails and preferably will stand four inches or so above the road surface. The rail 10 is connected by means of an electric cable 12 with rail 13 of the track, while rail 11 is connected by means of a cable 14 with the rail 15 of the track. A certain portion of the railroad track for a desired distance at either side of the highway is insulated from the track as a whole as indicated at 16 and 17.

Referring to Figs. 2 and 4 feelers 18 and 19 depend from the automobile frame, 18 being connected directly thereto and 19 being insulated therefrom. These feelers consist of resilient metal arms spaced apart at substantially the same distance as rails 10 and 11 and having at their lower ends transverse arms 20 and 21 provided with brushes 22 and 23 consisting of spring wire. The brushes 22 and 23 will normally extend to within about three inches of the ground so that when the vehicle straddles the rails 10 and 11 contact will be made between the respective brushes and rails.

Referring now to Figs. 3, and 5 to 7 particularly, 24 represents a base of suitable material attached by means of screws 25 to the dash 26 of the automobile. At one side of this base and, if the base be of conductive material, insulated therefrom, is a post 27 horizontally bent at its top as may be seen particularly in Fig. 4. Pivoted to the angular portion of post 27 and retained thereon by means of a nut 28 is an armature 29. Also fixed to the base 24 is an upright member 30 having its upper portion bent at right-angles and extending in the same direction as the angular portion of post 27. This horizontal portion 31 (Fig. 6) extends above armature 29 and is connected by means of a tension spring 32 to the latter. The horizontal portion 31 is obliquely bent transversely, as shown in Fig. 5, and is provided in the vertical swinging path of armature 29 with a contact point 33. Thus under the influence of spring 32 armature 29 will normally be held in abutment with contact 33. Post 27 is connected by cable 34 to the ignition switch of the automobile and the upright 30, which is, of course, of conductive material, is connected by cable 35 to the engine distributor. In other words post 27, armature 29 and upright 30 are interposed in the circuit leading from the engine switch to the timer, as here shown, but these members may be inserted at any convenient place in the ignition circuit.

Immediately beneath the armature 29 is secured an electro-magnet 36. The coil of this magnet is in connection at one end, as at 37, with post 27 and the other end of the coil is in connection, as at 38, with a bracket 39 secured to an insulated upright 40. The angular arm 41 of bracket 39 carries a contact 42 adapted to co-operate with a contact point 43 secured to a resilient arm 44 extending transversely relative to armature 29. The resilient arm 44 is supported at its end opposite to the contact point by a pedestal 45 and this latter is connected by a cable 46 (Fig. 4) to the insulated feeler 19.

Figure 6:
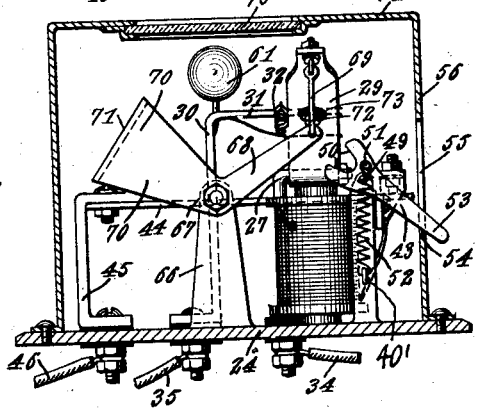
Fig. 6 is a section on the line 6—6 of Fig. 3.
Figure 7:
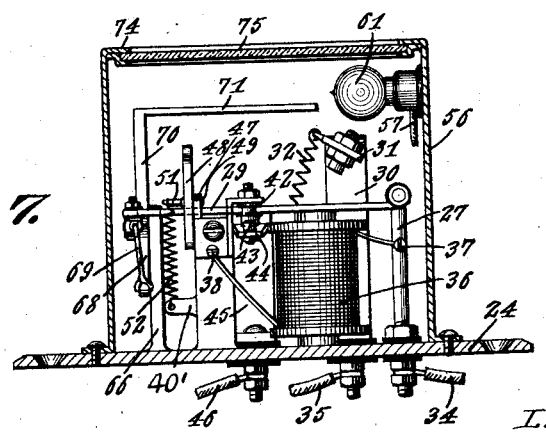
Fig. 7 is a view similar to Fig. 5 showing the parts in different relation.

As shown in Figs. 5 to 7, bracket 39 is provided with an upwardly extending arm 47, the plane of this arm being parallel to the plane of post 27 and its angular portion. A lever 48 is pivoted at 49 to arm 47, said lever having a pair of jaws 50 of which the upper, in the position of parts shown in Figs. 5 and 6, lies just outside the path of travel of armature 29 while the lower is adapted to be abutted by the armature in its downward travel. A pin 51 on lever 48 is connected by means of a tension spring 52 to a lug 45 on pedestal 40. Pin 51 is so arranged with respect to pivot 49 and lug 45 that upon swinging lever 49 from the position shown in Figs. 5 and 6 to that of Fig. 7 the longitudinal axis of the spring will pass from the right of pivot 49 to the left thereof. Consequently, as may be seen clearly from Fig. 6, in the upper limit position of the jaws, spring 52 acts to retain them in such position, while when the axis of spring 52 passes to the left through pivot 49, the jaws will be drawn downwardly. Any suitable abutment may be provided to restrain the upward movement of the jaws and as shown, tail 53 of lever 49 may abut the lower edge 54 of a slot 55 formed in the wall of casing 56, through which the tail projects. As shown in Fig. 4 the arm 47' which supports lever 48 is connected by means of a conductor 57 to the car frame at 60 and an electric light 61 and suitable electric horn 62 are interposed in this circuit which may be controlled by means of switch 63.

Conductor 34 leads through engine switch 64 to a pole of a battery or other suitable source of electrical energy 65, the other pole of which is grounded to the car frame and hence is in connection with feeler 18.

Pivotally mounted on a pedestal 66 is an angle lever extending transversely relative to armature 29. Arm 68 of this lever is connected with the end of armature 29 by means of a suitably articulated link 69 insulated therefrom. The other arm 70 of lever 67 is provided with an angular extension 71 whose plane is substantially tangential to its arc of travel. As shown in Fig. 3, extension 71 has the word "Stop" suitably marked thereon and light 61 is so disposed as to illuminate this member when it is exhibited. Finally armature 29 is provided with an abutment member 72 insulated therefrom by means of washers 73. The arc of travel of abutment 72 upon oscillation of armature 29 intersects resilient arm 44.

If now, an automobile equipped with the above described devices comes into the highway A so that its feelers contact with conductors 10 and 11 and a train is in the section in connection with these conductors, a circuit will be completed between the rails 13 and 15 through the wheels and axles of the car and magnet 36 will be energized. The circuit in which magnet 36 is included may be traced as follows:—battery 65 through switch 64 and post 27; bracket 39, arm 44, pedestal 45, conductor 46, feeler 19, rail 10, conductor 12, rail 13, rail 15, conductor 14, rail 11, feeler 18, to the car frame. The energization of the magnet causes armature 29 to be drawn down into the position shown in Fig. 7. During the last portion of the travel of armature 29, abutment 72 strikes arm 44 and the outer end of the armature strikes lower jaw 50. Thus arm 44 is forced out of contact with bracket 39 and lever 48 is swung about its pivot and the upper jaw 50 is brought into contact with the armature and held in such position by spring 52 whose longitudinal axis has passed to the left of pivot 49. It will be noted that the circuit now passes from the battery through armature 29, lever 48 and arm 47 to conductor 57 and through switch 63, which is normally closed, to the car frame. Thus lamp 61 will be lighted and horn 62 will be actuated until switch 63 is opened, and in the mean time the ignition circuit, of course, remains broken due to the position of armature 29.

As shown in Figs. 5 to 7, arm 47 is integral with conductor bracket 39 to which one end of the magnet coil is attached. Thus, the magnet will be connected in parallel with the circuit just described and will continue to attract armature 29. Upon opening switch 63 the magnet will be deenergized and if spring 32 is stronger than spring 52 the parts will be automatically returned to the position shown in Fig. 5. As illustrated in Fig. 4, however, arm 47' is not in connection with bracket 39 and hence upon separation of contact points 42 and 43, magnet 36 will be cut out of circuit. In this form, therefore, spring 52 must overpower spring 32 in order that jaw 50 may retain the armature in its lower position against the influence of the latter spring. Upon opening switch 63, consequently, the parts will not automatically return to the position shown in Fig. 5, and to return them, tail 53 of the lever 48 must be manually actuated.

It will be noted from Fig. 4 that the face 74 of casing 56 is provided with a window 75 of transparent material. As lever 67 is rocked by means of link 69 upon the descent of armature 29 extension 71 is brought in register with the window in a position to be clearly illuminated by lamp 61.

In Fig. 8 I have shown a brake lever 76 mounted in the usual manner upon a shaft 77 which is in connection with the car frame. The switch 63 may consist of a tongue 78 fastened beneath the floor of the car and in a position to contact normally with lever 76. Conductor 57 being in connection with tongue 78, the actuating circuit for the lamp and horn will be broken as soon as the operator applies the brake and removes lever 76 from contact with tongue 78. This arrangement is desirable in that the operator will instinctively apply the brakes as soon as his attention is attracted by the signaling devices and inasmuch as the usefulness of the latter has past upon such application they may be appropriately cut out.

From the above it will be apparent that my invention consists broadly in providing a circuit adapted to be closed upon the simultaneous presence of a motor driven roadway vehicle and a railway vehicle in road and track zones adjacent a grade crossing, whereby the circuit being closed the motor of the roadway vehicle is stopped. Simultaneously upon cutting out the motor this first circuit is broken and a second more direct circuit is closed which actuates signalling devices until the brake of the motor vehicle is applied by the operator. As shown in Fig. 1, conductors 10 and 11 are disposed at the right of the highway at either side of the track relative to an approaching vehicle. Thus, a vehicle which has already crossed the track will not be affected by the entrance of a railway vehicle into the insulated track section or zone. It will, of course, be understood that the lengths of rails 10 and 11 and the length of the insulated track section will only be governed by considerations of safety. If, for instance, there were separate trackways B for trains traveling in opposite directions, insulators 17 could be positioned directly adjacent the side of the highway in the receding direction of the train.

While I have shown and described specific embodiments of the various elements constituting my invention, it will, of course, be understood that the scope of my invention is in no sense restricted thereby, but is to be construed from the following claims.

I claim:

1. In a device of the kind described, highway conductors in electrical connection with railway track rails, contact means on a highway motor vehicle adapted to contact with said conductors, motor control means on the vehicle, and actuating means for said control means in circuit with said contact members, whereby said contact members being in contact with said conductors and a railway vehicle being on said rails, a circuit is completed through said actuating means and said control means is operated to cut out the motor of the roadway vehicle.

2. A device of the kind described, comprising a pair of conductors on the roadway surface each in electrical connection respectively with the rails of an insulated track section, a pair of contact members on the roadway vehicle adapted to contact respectively with said conductors, motor control means on said roadway vehicle, actuating means for said control means in circuit with said contact members, and a source of electrical energy in said circuit, whereby said contact members being in contact with said roadway conductors and a railway vehicle being in said insulated section, a circuit is closed through said actuating means, whereby said control means is operated for arresting said motor.

3. Apparatus according to claim 2, wherein the motor of the roadway vehicle is of the internal combustion engine type and the motor control means comprises a switch disposed in the ignition circuit of the motor.

4. In combination with a motor driven roadway vehicle having motor control means thereon, an actuator for said motor control means, and an electro-magnet adapted upon energization to attract said actuator whereby said motor control means is actuated to arrest the motor, said magnet being in a circuit closed upon the presence of the roadway vehicle and a railway vehicle in predetermined zones adjacent a grade crossing, and a sign displaying device on the roadway vehicle operative upon the closing of said circuit.

5. In combination with a motor driven roadway vehicle having motor control means thereon, an actuator for said motor control means, and an electro-magnet adapted upon energization to attract said actuator whereby said motor control means is actuated to arrest the motor, said magnet being in a circuit closed upon the presence of the roadway vehicle and a railway vehicle in predetermined zones adjacent a grade crossing, and a sign displaying device on the roadway vehicle actuated in dependence upon the movement of said actuator.

6. In combination with a motor driven roadway vehicle having motor control means thereon, an actuator for said motor control means, and an electro-magnet adapted upon energization to attract said actuator whereby said motor control means is actuated to arrest the motor, said magnet being in a circuit closed upon the presence of the roadway vehicle and a railway vehicle in predetermined zones adjacent a grade crossing, means for breaking said circuit upon the displacement of said actuator toward said magnet, and means for retaining said actuator in displaced position.

7. In combination with a motor driven roadway vehicle having motor control means thereon, an actuator for said motor control means, and an electro-magnet adapted upon energization to attract said actuator whereby said motor control means is actuated to arrest the motor, said magnet being in a circuit closed upon the presence of the roadway vehicle and a railway vehicle in predetermined zones adjacent a grade crossing, a sign in connection with said actuator and displayed upon the displacement of the latter toward said magnet and means for retaining said actuator in displaced position.

8. In combination with a motor driven roadway vehicle having motor control means thereon, an actuator for said motor control means, and an electro-magnet adapted upon energization to attract said actuator whereby said motor control means is actuated to arrest the motor, said magnet being in a circuit closed upon the presence of the roadway vehicle and a railway vehicle in predetermined zones adjacent a grade crossing, means for breaking said circuit operated by said actuator upon its displacement toward said magnet and means for retaining said actuator in displaced position.

9. In combination with a motor driven roadway vehicle having motor control means thereon, an actuator for said motor control means, and an electro-magnet adapted upon energization to attract said actuator whereby said motor control means is actuated to arrest the motor, said magnet being in a circuit closed upon the presence of the roadway vehicle and a railway vehicle in predetermined zones adjacent a grade crossing, means for breaking said circuit upon the displacement of said actuator toward said magnet, means for retaining said actuator in displaced position, a second circuit closed by said actuator in its displaced position, and a signalling device operated upon the closing of said second circuit.

10. In combination with a motor driven roadway vehicle having motor control means thereon, an actuator for said motor control means, and an electro-magnet adapted upon energization to attract said actuator whereby said motor control means is actuated to arrest the motor, said magnet being in a circuit closed upon the presence of the roadway vehicle and a railway vehicle in predetermined zones adjacent a grade crossing, means for breaking said circuit upon the displacement of said actuator toward said magnet, means for retaining said actuator in displaced position, a second circuit closed by said actuator in its displaced position, and a sound producing device operated upon the closing of said second circuit.

11. In combination with a motor driven roadway vehicle having motor control means thereon, an actuator for said motor control means, and an electro-magnet adapted upon energization to attract said actuator whereby said motor control means is actuated to arrest the motor, said magnet being in a circuit closed upon the presence of the roadway vehicle and a railway vehicle in predetermined zones adjacent a grade crossing, a sign displaying device on the roadway vehicle operative upon the closing of said circuit, a second circuit closed upon the movement of said actuator, and a lamp in said circuit adapted to illumine the sign.

12. In combination with a motor driven roadway vehicle having motor control means thereon, an actuator for said motor control means, and an electro-magnet adapted upon energization to attract said actuator whereby said motor control means is actuated to arrest the motor, said magnet being in a circuit closed upon the presence of the roadway vehicle and a railway vehicle in predetermined zones adjacent a grade crossing, a sign displaying device on the roadway vehicle operative upon the closing of said circuit, a second circuit closed upon the movement of said actuator, a lamp in said circuit adapted to illume the sign, and a sound producing device in said second circuit.

13. The combination with a railroad track and a motor vehicle, of a pair of ramps arranged in the path of the vehicle when approaching the track at a crossing, contact members carried by the vehicle to move over said ramps in contact therewith, electrical means on the vehicle connected to said contact members and arranged for stopping the vehicle, and bridging means for said ramps controlled by a train approaching the crossing on said track to control said electrical means when the contact members move over said ramps.

14. The combination with a railroad track and a motor vehicle, of a pair of ramps arranged in the path of the vehicle when approaching the track at a crossing, contact members carried by the vehicle to move over said ramps in contact therewith, electrical means on the vehicle connected to said contact members and arranged for stopping the vehicle when said contact members are bridged, and means for bridging said ramps when a train approaches the crossing on said track.

15. The combination with a railroad track and a motor vehicle, of a pair of ramps arranged in the path of the vehicle when approaching the track on a road, means controlled by the presence of a train on the track for bridging said ramps, contact members carried by the vehicle to move over said ramps in contact therewith, and electrical means on the vehicle connected to said contact members and arranged for bringing the vehicle to a stop when said contact members are bridged.

16. The combination with a rialroad track and a motor vehicle, of contact means arranged in the path of the vehicle when approaching the track at a crossing, contact means on the vehicle to engage the first named contact means, electrical means connected to the second-named contact means and having provisions for stopping the vehicle by the completion of an electrical circuit including the firstnamed and secondnamed contact means, and means connected to the firstnamed contact means and operable for completing said circuit when a train approaches the crossing on the track.

17. In a grade crossing safety system for preventing collisions between a roadway motor vehicle and a railway vehicle, an electric circuit on the motor vehicle closed upon the presence of the motor vehicle and a railway vehicle in predetermined zones adjacent the crossing, a brake lever on the motor vehicle and a braking means for said circuit operated upon operation of said brake lever.

18. In combination with a motor driven roadway vehicle having motor control means thereon, an actuator for said motor control means, and an electro-magnet adapted upon energization to attract said actuator whereby said motor control means is actuated to arrest the motor, said magnet being in a circuit closed upon the presence of the roadway vehicle and a railway vehicle in predetermined zones adjacent a grade crossing, means for breaking said circuit upon the displacement of said actuator toward said magnet, means for retaining said actuator in displaced position, a second circuit closed by said actuator in its displaced position, a signalling device operated upon closing of said second circuit, a brake lever on said motor vehicle, and breaking means for said second circuit operated upon operation of said brake lever.

In testimony whereof I have hereunto set my hand.

LEE O. CALLISTER.